(12) United States Patent
Elder et al.

(10) Patent No.: US 11,920,946 B2
(45) Date of Patent: Mar. 5, 2024

(54) DYNAMIC SCALING OF GEOSPATIAL DATA ON MAPS

(71) Applicant: Palantir Technologies Inc., Denver, CO (US)

(72) Inventors: Andrew Elder, New York, NY (US); Cooper Bills, Brooklyn, NY (US); Reese Glidden, Washington, DC (US)

(73) Assignee: Palantir Technologies Inc., Denver, CO (US)

( * ) Notice: Subject to any disclaimer, the term of this patent is extended or adjusted under 35 U.S.C. 154(b) by 287 days.

(21) Appl. No.: 17/527,442

(22) Filed: Nov. 16, 2021

(65) Prior Publication Data

US 2022/0074754 A1    Mar. 10, 2022

Related U.S. Application Data

(63) Continuation of application No. 16/242,615, filed on Jan. 8, 2019, now Pat. No. 11,175,157.

(Continued)

(51) Int. Cl.
*G06F 16/29* (2019.01)
*G01C 21/36* (2006.01)
(Continued)

(52) U.S. Cl.
CPC ....... *G01C 21/367* (2013.01); *G01C 21/3664* (2013.01); *G06F 3/04845* (2013.01); *G06T 3/40* (2013.01)

(58) Field of Classification Search
CPC .... G06F 16/29; G06F 16/9537; G06F 16/954; G06F 2203/04806; G06F 2203/04808;
(Continued)

(56) References Cited

U.S. PATENT DOCUMENTS 5,553,209 A    9/1996  Johnson
5,862,510 A    1/1999  Saga
(Continued)

FOREIGN PATENT DOCUMENTS

CA    2646117 A1    6/2010
WO    2008128133 A1   10/2008

OTHER PUBLICATIONS

Official Communication for European Patent Application No. 18174839.3 dated Aug. 22, 2018.
(Continued)

*Primary Examiner* — Hau H Nguyen
(74) *Attorney, Agent, or Firm* — Sheppard Mullin Richter & Hampton LLP

(57) ABSTRACT

Methods, systems, and non-transitory computer readable media configured to display a geographical map overlaid with a marker layer comprising at least one marker; receive input from a user to change a zoom level of the geographical map from a first map scale to a second map scale; display the geographical map at the second map scale; and overlay the marker layer at the second map scale with the at least one marker at a second marker size. The second marker size is determined based on a correlation between the second map scale and the second marker size, in which (i) the second marker size is increased or decreased in the same direction as the second map scale when the second map scale is within a range from a low threshold point to a high threshold point, and (ii) a ratio change between two adjacent marker sizes is smaller than a ratio change between two corresponding adjacent map scales when the second marker size is outside the range from the low threshold point to the high threshold point.

20 Claims, 10 Drawing Sheets

Related U.S. Application Data

(60) Provisional application No. 62/750,031, filed on Oct. 24, 2018.

(51) Int. Cl.
  *G06F 3/04845* (2022.01)
  *G06T 3/40* (2006.01)

(58) Field of Classification Search
  CPC .... G06F 3/0481; G06F 16/287; G06F 16/444; G06F 3/0485; G01C 21/367; G01C 21/3867; G01C 21/3667; G01C 21/26; G06T 3/40; G06T 11/00; G06T 17/05; G06T 2207/20101; G09G 2340/045; G09G 2340/12; G09G 2380/12; G09G 5/377
  See application file for complete search history.

(56) References Cited

U.S. PATENT DOCUMENTS

| | | |
|---|---|---|
| 6,640,185 B2 | 10/2003 | Yokota et al. |
| 9,009,610 B2 | 4/2015 | Florance et al. |
| 9,097,540 B2 | 8/2015 | Yamamoto |
| 9,613,546 B2 | 4/2017 | Coroy |
| 9,699,610 B1 | 7/2017 | Chicoine |
| 10,242,115 B2 | 3/2019 | Hultgren |
| 2005/0261826 A1 | 11/2005 | Kurosawa |
| 2008/0010273 A1 | 1/2008 | Frank |
| 2008/0013792 A1 | 1/2008 | Houllier |
| 2008/0051994 A1 | 2/2008 | Fisher et al. |
| 2008/0065685 A1 | 3/2008 | Frank |
| 2008/0162031 A1 | 7/2008 | Okuyama |
| 2010/0115407 A1 | 5/2010 | Kim |
| 2010/0235081 A1 | 9/2010 | Doi |
| 2010/0305851 A1 | 12/2010 | Meyer et al. |
| 2011/0007076 A1 | 1/2011 | Nielsen |
| 2012/0023446 A1 | 1/2012 | Minde |
| 2012/0046861 A1 | 2/2012 | Feldbauer |
| 2012/0110019 A1 | 5/2012 | Nielsen |
| 2012/0178473 A1 | 7/2012 | Wiren et al. |
| 2013/0101033 A1 | 4/2013 | Joshi |
| 2013/0113739 A1 | 5/2013 | Lee |
| 2013/0130746 A1 | 5/2013 | Song |
| 2013/0176307 A1 | 7/2013 | Tomaru |
| 2014/0011522 A1 | 1/2014 | Lin et al. |
| 2014/0157139 A1 | 6/2014 | Coroy |
| 2014/0280180 A1 | 9/2014 | Edecker |
| 2015/0058345 A1 | 2/2015 | Mishra et al. |
| 2015/0095355 A1 | 4/2015 | Patton |
| 2015/0161766 A1 | 6/2015 | Cazaux |
| 2015/0339307 A1 | 11/2015 | Hultgren |
| 2015/0356088 A1 | 12/2015 | Berkhin et al. |
| 2015/0369623 A1 | 12/2015 | Blumenberg |
| 2016/0180060 A1 | 6/2016 | Nelson |
| 2016/0180556 A1 | 6/2016 | Deng |
| 2016/0234635 A1 | 8/2016 | Chen |
| 2016/0236795 A1 | 8/2016 | Marczi |
| 2016/0246468 A1 | 8/2016 | Harrower |
| 2017/0011635 A1 | 1/2017 | Whitlow |
| 2017/0052654 A1 | 2/2017 | Cervelli et al. |
| 2018/0075061 A1 | 3/2018 | Purumala et al. |
| 2018/0129340 A1 | 5/2018 | Westhues |
| 2019/0057136 A1 | 2/2019 | Constantinides |
| 2019/0137297 A1 | 5/2019 | Ueda |

OTHER PUBLICATIONS

Official Communication for European Patent Application No. 19166099.2 dated May 29, 2019.
Official Communication for U.S. Appl. No. 15/788,043 dated Aug. 24, 2018.
Official Communication for U.S. Appl. No. 15/788,043 dated Jan. 12, 2018.
Official Communication for U.S. Appl. No. 15/788,043 dated Mar. 7, 2019.

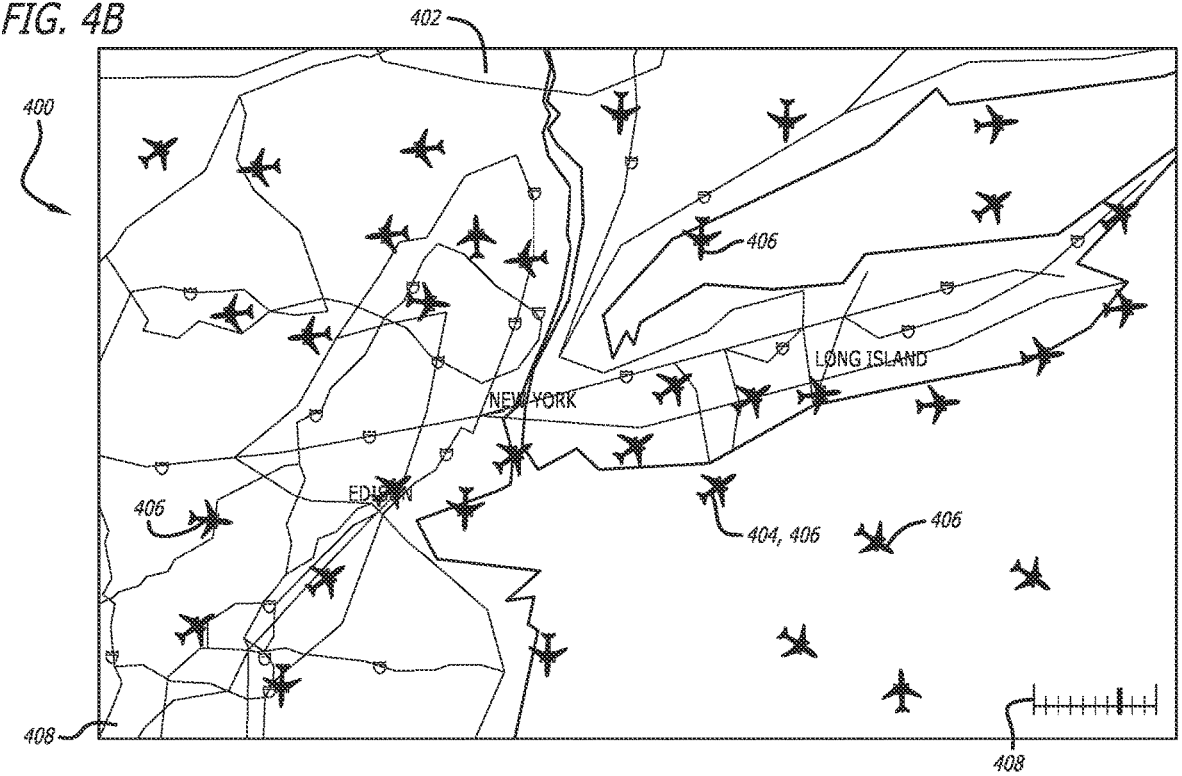

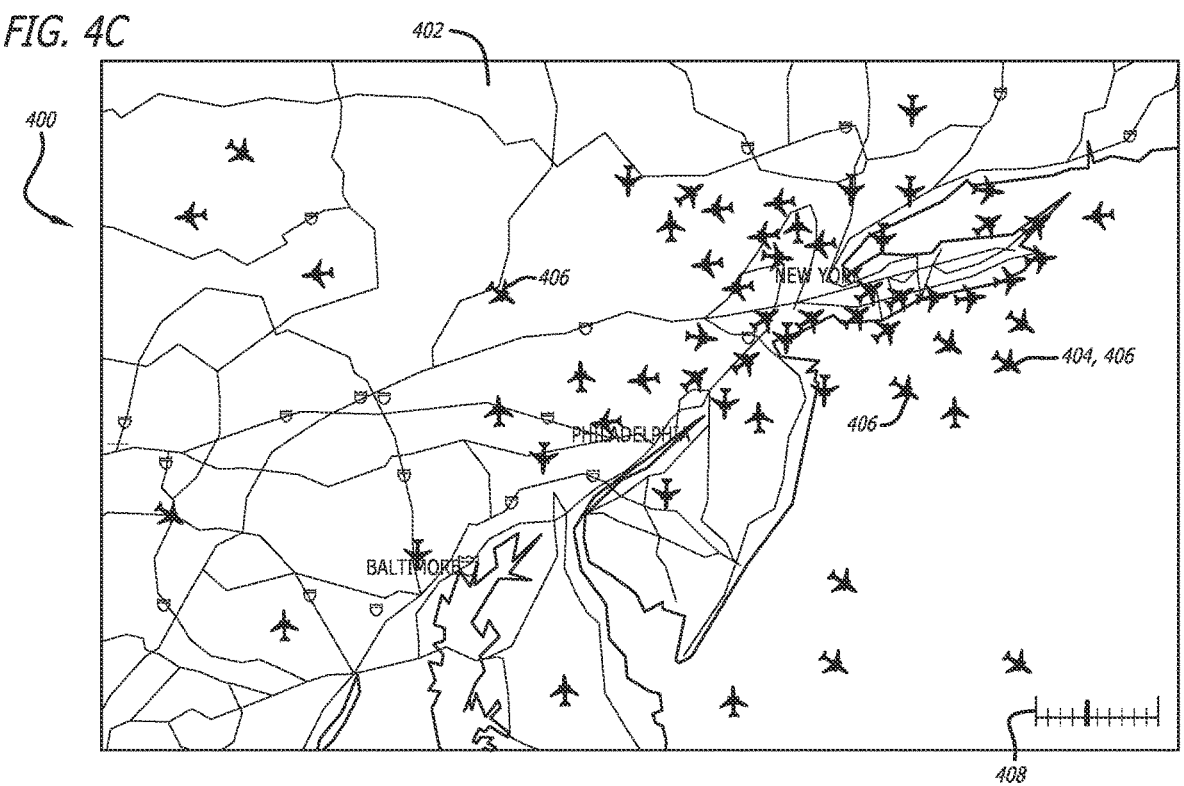

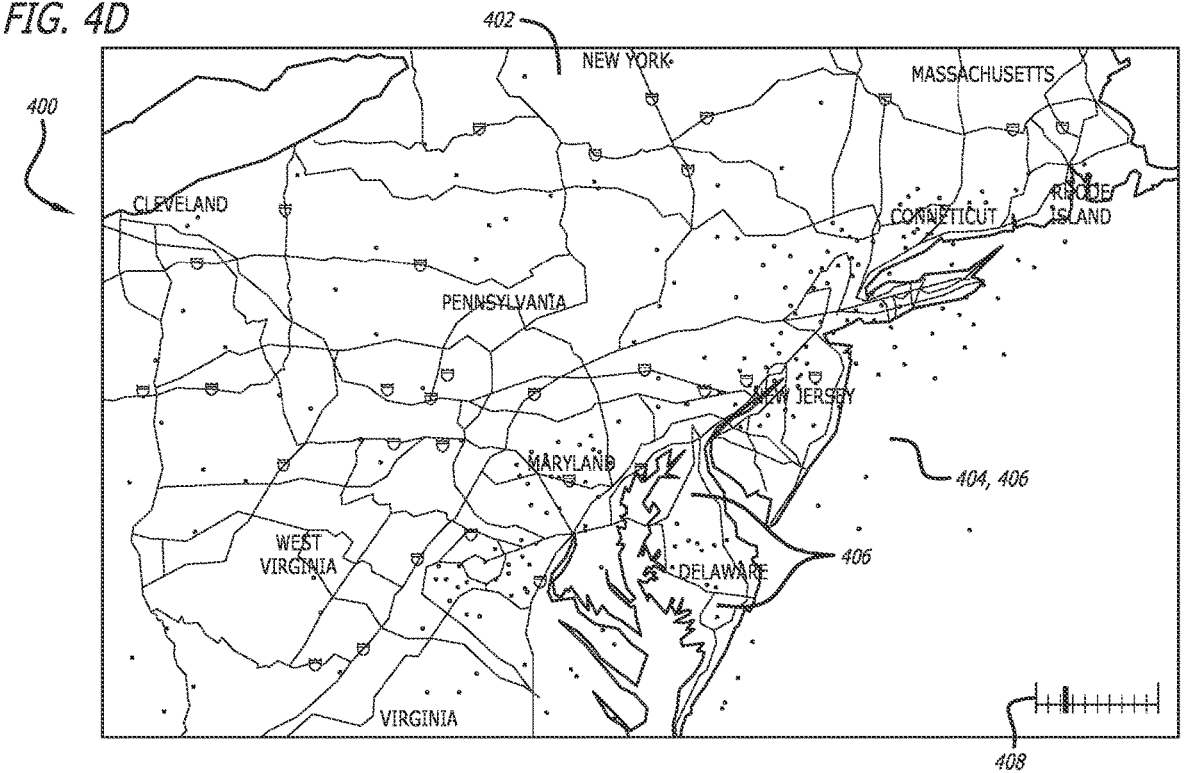

500

Display a geographical map overlaid with a marker layer comprising at least one marker, wherein the geographical map and the marker layer are presented at a first map scale and the at least one marker is presented at a first marker size.
502

Receive an input from a user to change a zoom level of the geographical map from the first map scale to a second map scale.
504

Determine a second marker size based on a correlation between the second map scale and the second marker size.
506

Display the geographical map at the second map scale.
508

Overlay the marker layer at the second map scale with at least one marker at the second marker size.
510

FIG. 5

DYNAMIC SCALING OF GEOSPATIAL DATA ON MAPS

CROSS REFERENCE TO RELATED APPLICATIONS

This application is a continuation of U.S. application Ser. No. 16/242,615, filed Jan. 8, 2019, which claims the benefit under 35 U.S.C. § 119(e) of the U.S. Provisional Application Ser. No. 62/750,031, filed Oct. 24, 2018, the content of each of which is hereby incorporated by reference in its entirety.

FIELD OF THE DISCLOSURE

This disclosure relates generally to geographic information systems (GIS) and, more particularly, to improved methods of visualizing geospatial data across the spectrum of map scales.

BACKGROUND

Under conventional approaches, geospatial data can be integrated into a geographical map and locations associated with geospatial data can be represented by markers on the map. However, markers can overlap and the map can become visually overwhelming when large data sets are mapped at certain scales. It should be appreciated that there is a need for an improved method of visualizing geospatial data, which allows trends and patterns to be revealed at smaller map scales while maintaining the ability to identify individual markers at small and large scales. The present technology fulfills this need and provides further related advantages.

SUMMARY

Various embodiments of the present disclosure can include systems, methods, and non-transitory computer readable media configured to provide a computer system and a related a user interface through which a geographical map can be presented and overlaid with a marker layer comprising at least one marker. The geographical map and the marker layer can be presented at a first map scale and the at least one marker can be presented at a first marker size. In various embodiments, users can interact with the user interface to change the zoom level of the geographical map from the first map scale to a second map scale. Once this selection is made, the computing system can provide dynamic scaling of the at least one marker to reduce visual clutter, allowing trends and patterns to be revealed at smaller maps scales while maintaining the ability to identify individual markers at small and large scales.

For example, in one embodiment, the methods, systems, and non-transitory computer readable media can be configured to determine a second marker size based on a correlation between the second map scale and the second marker size, wherein (i) the second marker size is increased or decreased in the same direction as the second map scale when the second map scale is within a range from a low threshold point to a high threshold point, and (ii) a ratio change between two adjacent marker sizes is smaller than a ratio change between two corresponding adjacent map scales when the second marker size is outside the range from the low threshold point to the high threshold point. Once the second marker size is determined, the computing system can display the geographical map at the second map scale, and overlay the marker layer at the second map scale with the at least one marker at the second marker size.

In one embodiment, the second marker size can be a fixed-pixel-size when the second map scale is greater than the high threshold point. In another embodiment, the second marker size can be one pixel when the second map scale is less than the low threshold point. In one embodiment, the correlation can be linear, quadratic, or logarithmic, without limitation, within the range from the low threshold point to the high threshold point In one embodiment, the low threshold point can be greater than a minimum map scale. In another embodiment, the high threshold point can be less than a maximum map scale. In a further embodiment, the low threshold point and the high threshold point can be determined from threshold parameters. In an additional embodiment, the threshold parameters can be selected from the group consisting of: marker type, marker density, and screen resolution.

In one embodiment, the at least one marker can comprise at least one marker of a first type and at least one marker of a second type. In another embodiment, the correlation between the second map scale and the second marker size for the at least one marker of the first type can be different than the correlation between the second map scale and the second marker size for the at least one marker of the second type. In a further embodiment, the low threshold point for the at least one marker of the first type is not equal to the low threshold point for the at least one marker of the second type. In an additional embodiment, the high threshold point for the at least one marker of the first type is not equal to the high threshold point for the at least marker of the second type. In yet another embodiment, the threshold parameters for the at least one marker of the first type can be different than the threshold parameters for the at least one marker of the second type.

Each feature or concept outlined above is independent and can be combined with other features or concepts outlined above or with any other feature or concept disclosed in this application. Other features and advantages of the disclosure should become apparent from the following description of the preferred embodiments, taken in conjunction with the accompanying drawings, which illustrate, by way of example, the principles of the disclosure.

BRIEF DESCRIPTION OF THE DRAWINGS

FIGS. 4B-4D illustrate the user interface of FIG. 4A, with the zoom level at progressively smaller scales, in accordance with one embodiment of the present disclosure.

FIG. 5 illustrates an example method of providing dynamic scaling of a marker layer in accordance with one embodiment of the present disclosure.

DETAILED DESCRIPTION

An improved approach rooted in computer technology overcomes the previously discussed problems and other difficulties associated with conventional approaches. Based on computer technology, the disclosed embodiments can provide a user interface through which a geographical map can be presented. The geographical map can be overlaid with a marker layer comprising at least one marker, wherein the geographical map and the marker layer are presented at a first map scale and the at least one marker is presented at a first marker size. In various embodiments, users can interact with the user interface to change the zoom level of the geographical map from the first map scale to a second map scale. Once this selection is made, the computing system can determine a second marker size based on a correlation between the second map scale and the second marker size, wherein (i) the correlation is positive (i.e., the second marker size is increased or decreased as compared to the first marker size in the same direction as the second map scale as compared to the first map scale) when the second map scale is within a range from a low threshold point to a high threshold point, and (ii) a ratio change between two adjacent marker sizes is smaller than a ratio change between two corresponding adjacent map scales when the second marker size is outside the range from the low threshold point to the high threshold point. Once the second marker size is determined, the computing system can display the geographical map at the second map scale, and overlay the marker layer at the second map scale with the at least one marker at the second marker size.

Figure 1:
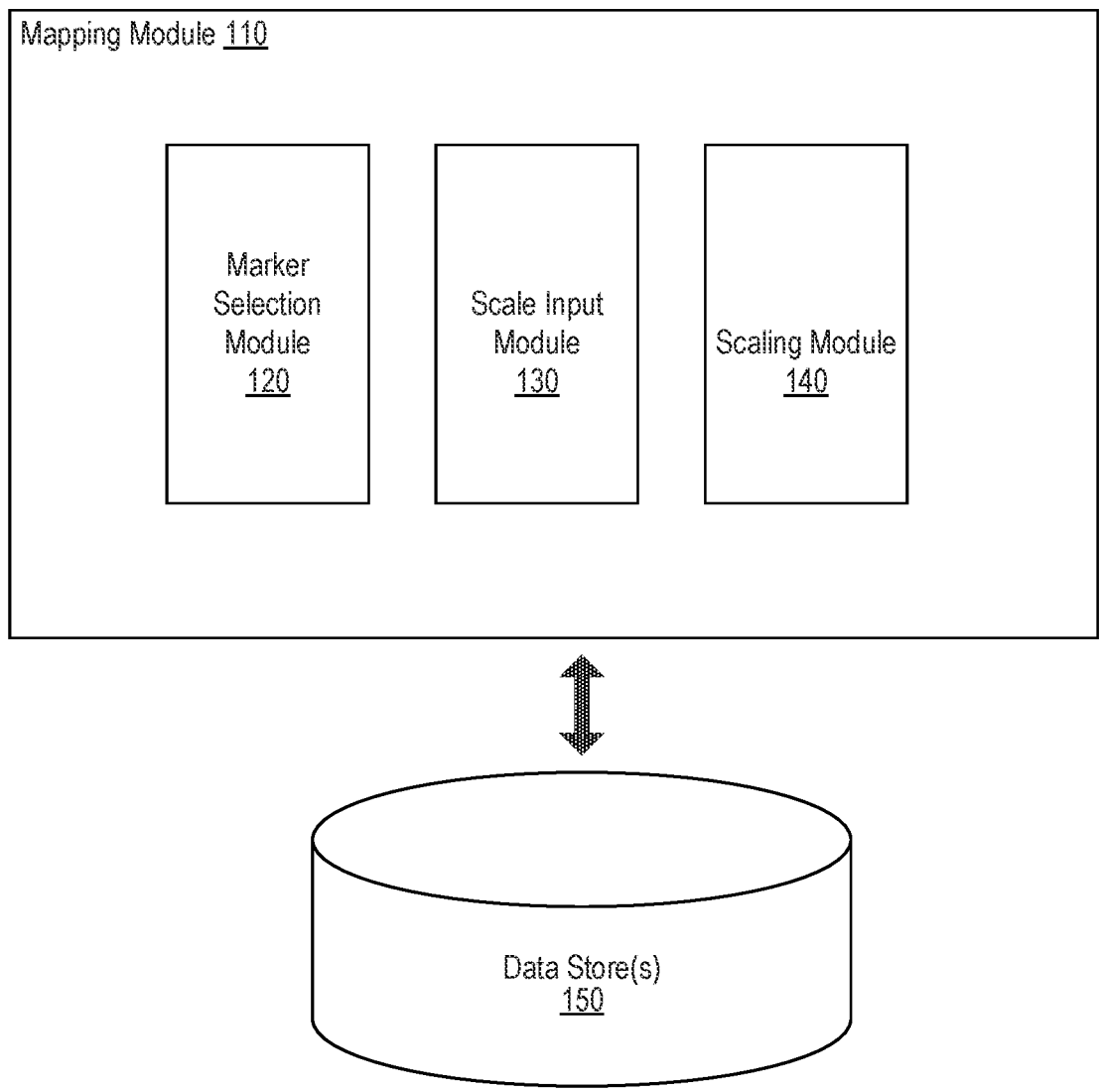
FIG. 1 illustrates a system including a mapping module in accordance with one embodiment of the present disclosure.

With reference now to FIG. 1 of the illustrative drawings, there is shown a system 100 including a mapping module 110 configured to provide dynamic scaling of a marker layer comprising at least one marker. The mapping module 110 can be configured to display a geographical map overlaid with the marker layer, wherein the geographical map and the marker layer are presented at a first map scale and the at least one marker is presented at a first marker size. The methods, systems, and non-transitory computer readable media are further configured to receive an input from a user to change a zoom level of the geographical map from the first map scale to a second map scale. Once this selection is made, the mapping module 110 can be configured to determine a second marker size based on a correlation between the second map scale and the second marker size, wherein (i) the second marker size is increased or decreased in the same direction as the second map scale when the second maps scale is within a range from a low threshold point to a high threshold point, and (ii) a ratio change between two adjacent marker sizes is smaller than a ratio change between two corresponding adjacent map scale when the second marker size is outside the range from the low threshold point to the high threshold point. The methods, systems, and non-transitory computer readable media are further configured display the geographical map at the second map scale, and overlay the marker layer at the second map scale with the at least one marker at the second marker size.

As shown in FIG. 1, in one embodiment, the mapping module 110 can include a marker selection module 120, a scale input module 130, and a scaling module 140. In some instances, the example system 100 can include at least one data store 150. The components (e.g., modules, elements, etc.) shown in this and all other figures are exemplary only, and other implementations can include additional, fewer, integrated, or different components. For example, in another embodiment, the mapping module 110 might not include the marker selection module 120. Some components might not be shown so as to not obscure relevant details.

The mapping module 110 can be implemented, in part or in whole, as software, hardware, or as a combination of software and hardware. In general, a module can be associated with software, hardware, or any combination of software and hardware. In some cases, the mapping module 110 can be implemented, in part or in whole, as software running on one or more computer devices or systems, such as on a server computing system or a user (or client) computing system. For example, the mapping module 110, or at least a portion of it, can be implemented as or within an application, a program, or an applet, etc., running on a user computing device for a client computing system, such as the user device 610 of FIG. 6. In another example, the mapping module 110, or at least a portion of it, can be implemented using one or more computing devices or systems that include one or more servers, such as network servers or cloud servers. It should be understood that there can be many variations or other possibilities.

The marker selection module 120 can be configured to allow a user to select data to present with a geographic map. In some embodiments, the marker selection module 120 can present the user with a list of available data sets for selection. As is discussed in more detail below, in some embodiments, each data object in the data sets can be have a geographic or locational component. For example, a user might select a geospatial data set representing information about every current flight in the world. Each data object in the set can be represented by a marker (e.g., an icon of an airplane). Once the user selects the data set, the marker selection module 120 can be configured to overlay a marker layer over the geographical map, wherein the marker layer comprises at least one marker representing a data object.

The scale input module 130 can be configured to receive an input from a user to change a zoom level of the geographical map (and the marker layer, if one is active). In some embodiments, a lower zoom level can show entire continents or the entire world, while higher zoom levels can show details of a city of block. For example, the system might include 23 zoom levels that range from a global scale (e.g., zoom level 0 at about 1:591,000,000) to a local scale (zoom level 23 at about 1:70). In one embodiment, the scale input module 130 can be configured to accept input from a user (e.g., from a scroll wheel or a gesture on a touch screen or trackpad) to select a desired zoom level and communicate the desired zoom level to the scaling module 140.

The scaling module 140 can be configured to scale the geographical map and the marker layer to the desired zoom level. The scaling module 140 is described in greater detail below.

Furthermore, in one embodiment, the mapping module 110 can be configured to communicate or operate with at least one data store 150, as shown in the example system 100. The data store 150 can be configured to store and maintain various types of data. In some implementations, the data store 150 can store information associated with the system (e.g., the user device 600 of FIG. 6). The information associated with the system can include, for example, geospatial data and other types of data. For example, the geospatial data can comprise information that has a geographical aspect to it. In various embodiments, the data store 150 can be configured to store geographic data objects, which can comprise a geographic location property, geographic object properties, and geographic data object links. In some embodiments, the geographic location property can include information describing a geographic location with which the geographic data is associated. For example, geographic location property can include GPS coordinates, a street address, a three word geographic address, or any other geographic coding scheme that can represent a location with which the geographic data object is associated. Geographic object properties can be an object property type that includes data describing a given geographic location. For example, a geographic object property can include information about assets, vehicles, populations, personnel, buildings, or other types of data associated with the geographic locations. In some embodiments, the geographic data link can include a link to any type of data object. Thus, the geographic data structure can define a data ontology for a geographic data object, which can be a data object that corresponds to a map, geographic location, or any other data associated with the geographic location. It can be contemplated that there can be many variations or other possibilities.

Figure 2:
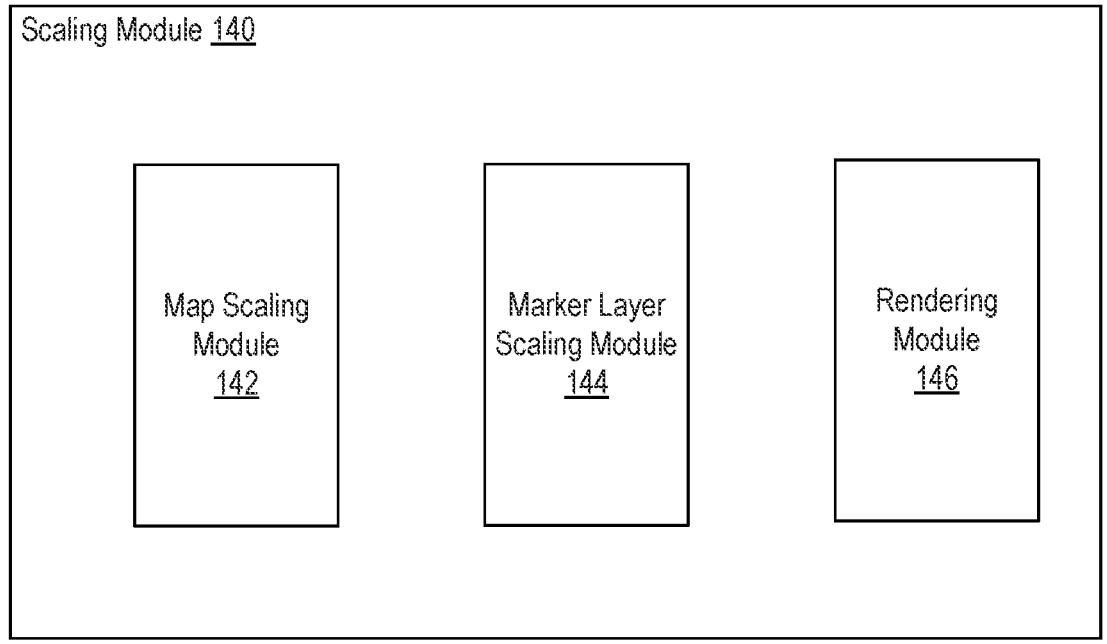
FIG. 2 illustrates a scaling module in accordance with one embodiment of the present disclosure.

FIG. 2 illustrates a scaling module 140 configured to scale the geographical map and the marker layer to the desired zoom level, in accordance with one embodiment of the present disclosure. As shown in FIG. 2, the scaling module 140 can include a map scaling module 142, a marker layer scaling module 144, and a rendering module 146. In one embodiment, the scaling module 140 does not include the rendering module 146.

The map scaling module 142 can be configured to scale the geographical map to a desired zoom level. The zoom property defines the resolution at which to display a map, where zoom 0 corresponds to a map of the entire Earth and larger zoom levels zoom in at higher resolution. In some embodiments, map images can be broken up in to map tiles and zoom levels. At low zoom levels, a small set of map tiles covers a wide area, while at higher zoom levels, the tiles are of higher resolution and cover a smaller area. In some embodiments, the map scaling module 142 can be configured to select and display the appropriate set of map tiles to present the geographical map at the desired zoom level. The map scaling module 142 can be configured to receive the desired zoom level from the user directly or via the scale input module 130.

The marker layer scaling module 144 can be configured to scale the marker to the appropriate size for the selected zoom level. For example, when a marker layer and a geographical map are displayed at a first zoom level, the at least one marker in the marker layer will have a first marker size. After the user selects a second zoom level, the marker layer scaling module 144 can be configured to determine a second marker size based on a correlation between the second map scale and the second marker size. For example, in some embodiments, the marker layer scaling module 144 can determine whether the second map scale is within a range from a low threshold point to a high threshold point. If the second map scale is within the range, the map scale and the marker scale change in the same direction. If, however, the second map scale is outside this range, a ratio change between two adjacent marker sizes can be smaller than a ratio change between two corresponding adjacent map scales.

When the map scale is changed within the range, in various embodiments, there is a positive correlation between the map scale and the marker scale. That is, when the map scale is increased, the marker scale is also increased; when the map scale is decreased, the marker scale is also decreased. In one embodiment, the correlation within the range is linear. In another embodiment, the correlation within the range is quadratic. In a further embodiment, the correlation within the range is logarithmic.

In various embodiments, the second marker size can be a maximum fixed-pixel-size when the second map scale is greater than the high threshold point, which can be less than the maximum map scale. In addition, the second marker size can be a minimum fixed-pixel-size when the second map scale is less than the low threshold point, which can be greater than the minimum map scale. In one embodiment, the minimum fixed-pixel-size can be as small as a single pixel.

Thus, marker layer scaling module 144 can scale the marker layer such that the at least one marker can have (1) a maximum fixed size on the display for all zoom levels within a range from the high threshold point to a maximum map scale, (2) a minimum fixed size (e.g., one pixel) for all zoom levels within a range from the low threshold point to a minimum map scale, and (3) a size that is increased or decreased in the same direction as the selected map scale for all zoom levels within a range between the low threshold point and the high threshold point.

In one embodiment, the marker layer scaling module 144 can be configured to determine the low threshold point and the high threshold point from threshold parameters. In another embodiment, the threshold parameters can be selected from the group consisting of: marker type (e.g., airplane, building, personnel, etc.), marker density, and screen resolution. Thus, for example, the marker layer scaling module 144 might set the high threshold point at zoom level 16 if the markers are densely clustered and overlapping (at their maximum fixed size) at zoom level 15.

It should be understood that a marker layer can comprise at least one marker of a first type and at least one marker of a second type. In alternative embodiments, a first marker layer can comprise at least one marker of a first type (e.g., airplanes) and a second marker layer can comprise at least one marker of a second type (e.g., personnel). In these cases, the correlation between the second map scale and the second marker size for the at least one marker of the first type can be different than the correlation between the second map scale and the second marker size for the at least one marker of the second type. For example, in various embodiments, the low threshold point for the at least one marker of the first type can be different than the low threshold point for the at least one marker of the second type. Similarly, the high threshold point for the at least one marker of the first type can be different than the high threshold point for the at least one marker of the second type. In addition, the threshold parameters for the at least one marker of the first type can be different than the threshold parameters for the at least one marker of the second type.

The rendering module 146 can be configured to produce a rendered image of the geographical map overlaid with the marker layer. For example, after the map scaling module 142 scales the geographical map to a second map scale and the marker layer scaling module 144 scales the at least one marker to a second marker size, the rendering module 146 can display the geographical map at the second map scale, align the scaled marker layer over the geographical map, and display the marker layer over the geographical map.

Figure 3:
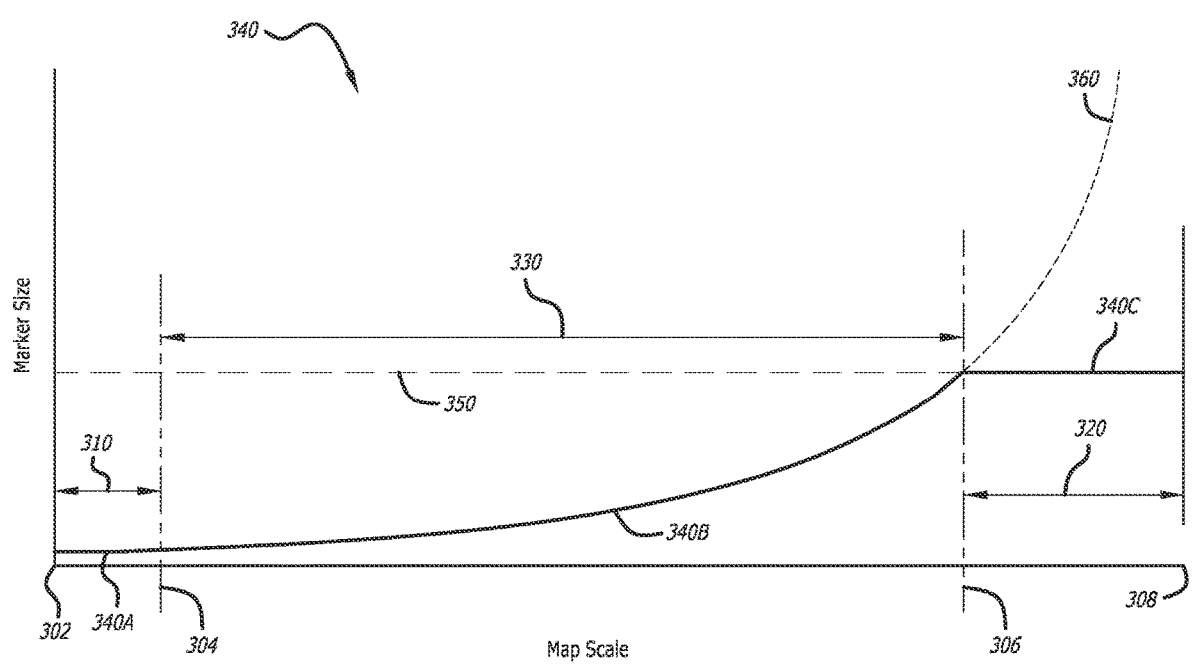
FIG. 3 illustrates an example graph illustrating a correlation between the map scale and the marker size in accordance with one embodiment of the present disclosure.

FIG. 3 provides an example graph illustrating a correlation 340 between the map scale and the marker size in accordance with one embodiment of the present disclosure. As is shown by segment 340B, the marker's size can scale in proportion to the map scale when the map scale is within a range 330 between a low threshold point 304 and a high threshold point 306. In this way, the marker can maintain an approximately constant size in meters, relative to the map scale, for all scales within this range 330. In one embodiment, the marker's size can scale logarithmically with the map scale when the map scale is within this range 330. However, when the second map scale is outside this range 330, a ratio change between two adjacent marker sizes can be smaller than a ratio change between two corresponding adjacent map scales. For example, as is shown by segment 340A, the marker can have a minimum fixed-pixel-size when the map scale is within a range 310 from the minimum map scale 302 to the low threshold point 304. In one embodiment, the minimum fixed-pixel-size can be as small as a single pixel. In addition, as is shown by segment 340C, the marker can have a maximum fixed-pixel-size when the map scale is within a range 320 from the high threshold point 306 to the maximum map scale 308. In this way, the correlation 340 between the map scale and the marker size can vary across the range of maps scales. This is in contrast to "fixed scale" scaling, in which the marker maintains a fixed-pixel-size across all map scales (e.g., line 350) and "geo scale" scaling, in which the marker maintains an approximately constant size in meters relative to the geographical map across all map scales (e.g., curve 360).

In some embodiments, the correlation between the map scale and the marker size can be different for different marker types. Thus, in cases where a marker layer comprises more than one type of marker, each of the different types of markers can have different threshold points 304, 306, determined from different threshold parameters (e.g., marker type, marker density, and screen resolution).

Figure 4A:
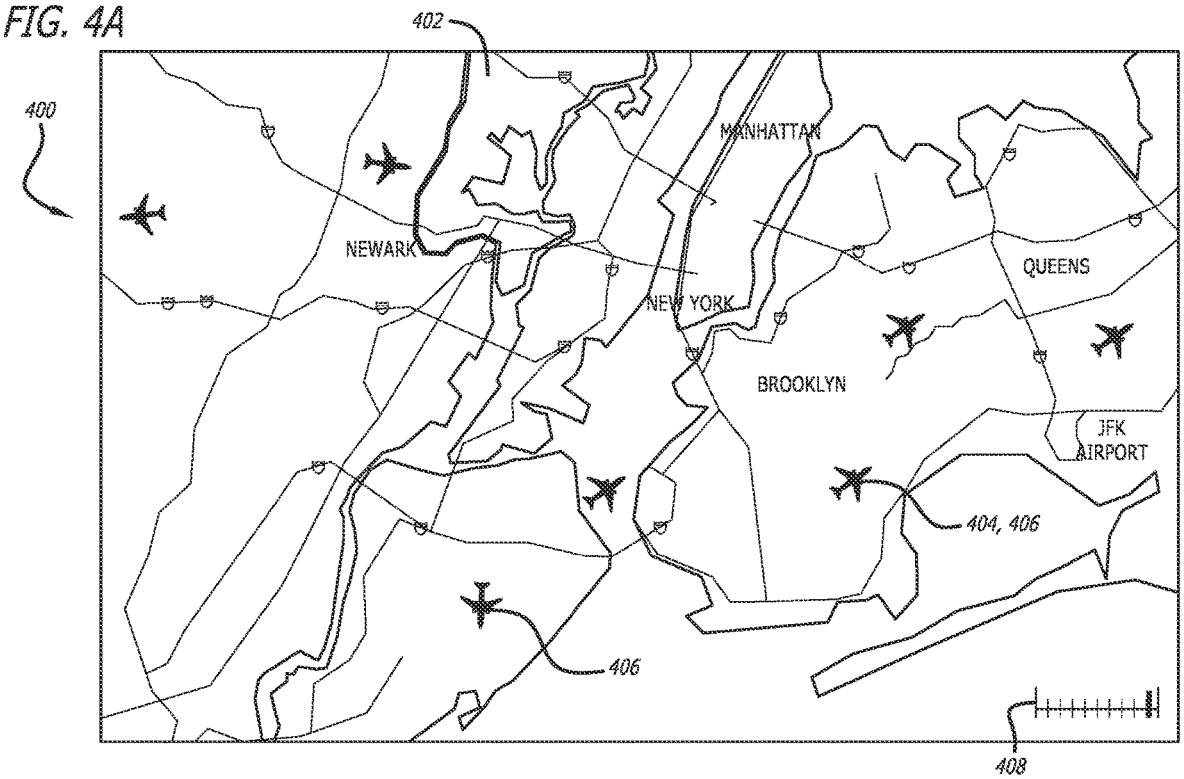
FIG. 4A illustrates a user interface showing a geographical map overlaid with a marker layer in accordance with one embodiment of the present disclosure.

FIG. 4A provides an example interface 400 that allows users to display a geographical map 402 overlaid with a marker layer 404 comprising at least one marker 406, according to one embodiment. In this example, the interface 400 can be presented through a display screen of the computing device. In various embodiments, the interface 400 can be accessed through a software application that is running on a computing device. For example, the user interface 400 can be accessible through a web browser. In another example, the user interface 400 can be provided through a data analysis application or as a service of a network (e.g., software as service). Depending on the computing device, the user can be able to interact with the user interface 400 using various input devices (e.g., keyboard, mouse, etc.) or touch gestures. The user interface 400 is provided merely as an example and, naturally, the arrangement and configuration of the interface can vary depending on the implementation. Thus, depending on the implementation, the user interface 400 can include additional or alternative features.

In various implementations, the interface 400 can present map data 402. In general, the map data can provide a visual representation of a desired geographic region and at various levels of detail. In some implementations, the interface 400 can provide a search option through which users can search for desired geographic regions. In the example of FIG. 4A, the interface 400 is presenting map data 402 that provides a visual representation of a geographic region. In some implementations, the map interface 400 can provide a set of software tools that allow users to navigate and customize the display of the map data 402. For example, such software tools can perform operations such as panning the map data 402, modifying the zoom level of the map data 402, accessing different map layers 404, altering naming conventions, and selecting and deselecting features included in the map data 402, among others.

A user interacting with the map interface 400 can select geospatial data to present with the map data 402. In the example of FIG. 4A, the interface 400 is presenting real-time data of all airplanes flying around the world. Each data point is represented by a marker 406 in a marker layer 404 overlaid over the map data 402.

The interface 400 can further include an indication of the zoom level 408. In the example of FIG. 4A, the map data 402 and the marker layer 404 are shown at a larger scale, near the maximum zoom level. At this larger scale, the map data 402 includes more detail with less coverage. In this example, the zoom level 408 is at or beyond the high threshold point and the marker 406 is at a maximum fixed-pixel-size. Thus, if the user were to increase the zoom level 408 any further, the map data 402 would be resized to a larger scale, but the marker 406 would maintain the same maximum fixed-pixel-size.

FIGS. 4B-4D illustrate the interface 402 of FIG. 4A with the zoom level 408 at progressively smaller scales. In FIGS. 4B and 4C, the zoom level 408 is below the high threshold point but above the low threshold point. If the marker 406 were to remain at the same fixed-pixel-size for zoom levels 408 within this range, the interface 400 would become visually overwhelming as the map scales to include more coverage and the markers 406 begin to overlap and dominate the interface 400. Existing attempts to mitigate this problem typically include removing overlapping markers, collapsing overlapping markers, or modifying the marker locations to minimize the overlap. These solutions hamper attempts to visualize and identify trends and patterns at smaller map scales. In contrast, the marker 406 in FIGS. 4B and 4C can scale in proportion to the map scale to minimize visual clutter while maintaining the ability to visualize and identify trends and patterns at smaller map scales.

In FIG. 4D, the map data 402 and the marker layer 404 are shown at a smaller scale, near the minimum zoom level. At this smaller scale, the map data 402 includes less detail with more coverage. In this example, the zoom level 408 is at or below the low threshold point and the marker 406 is at a minimum fixed-pixel-size. Thus, if the user were to decrease the zoom level 408 any further, the map data 402 would be resized to a smaller scale, but the marker 406 would maintain the same minimum fixed-pixel-size. In some embodiments, the minimum fixed-pixel-size can be as small as one pixel.

FIG. 5 illustrates an example method 500 associated with providing dynamic scaling of a marker layer comprising at least one marker, according to one embodiment. It should be appreciated that, unless otherwise stated, the method can include additional, fewer, or alternative steps performed in similar, parallel, or alternative orders.

At block 502, the example method 500 can display a geographical map overlaid with a marker layer comprising at least one marker, wherein a geographical map and the marker layer are presented at a first map scale and the at least one marker is presented at a first marker size. At block 504, the example method 500 can receive an input from a user to change a zoom level of the geographical map from the first map scale to a second map scale. At block 506, the example method 500 can determine a second marker size based on a correlation between the second map scale and the second marker size, in which (i) the second marker size is increased or decreased in the same direction as the second map scale when the second map scale is within a range from a low threshold point to a high threshold point, and (ii) a ratio change between two adjacent marker sizes is smaller than a ratio change between two corresponding adjacent map scales when the second marker size is outside the range from the low threshold point to the high threshold point. At block 508, the example method 500 can display the geographical map at the second map scale. At block 510, the example method 500 can overlay the marker layer at the second map scale with the at least one marker at the second marker size.

Mapping System—Example Implementation

Figure 6:
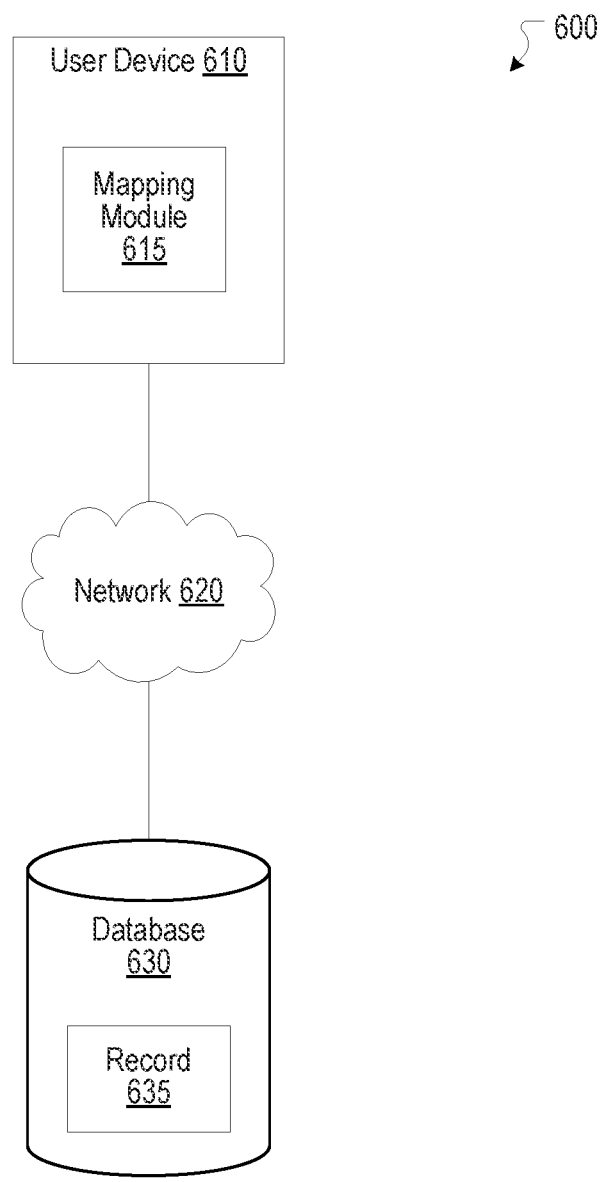
FIG. 6 illustrates a network diagram of an example system including a user device, in accordance with one embodiment of the present disclosure.

FIG. 6 illustrates a network diagram of an example system 600 that can be used in various scenarios, according to an embodiment of the present disclosure. The system 600 can include one or more user devices 610, a network 620, and one or more databases 630. For purpose of illustration, the embodiment of the system 600, shown by FIG. 6, includes a single user device 610 and a single database 630. However, in other embodiments, the system 600 can include more user devices 610, databases 630, or both.

The user device 610 can comprise one or more computing devices (or systems) that can receive input from a user and transmit and receive data via the network 620. Furthermore, while the database 630 is shown as being connected to the network 620 and connected to the user device 610 via the network 620, it should be understood that the database 630 can be connected directly to the user device 610. In one embodiment, the user device 610 can be a conventional computer systems executing, for example, a Microsoft Windows compatible operating system (OS), Apple OS X, or a Linux distribution. In another embodiment, the user device 610 can be a device having computer functionality, such as a smart-phone, a tablet, a personal digital assistant (PDA), a mobile telephone, etc. The user device 610 can be configured to communicate via the network 620. The user device 610 can execute applications, for example, a browser application that allows a user of the user device 610 to interact with the database 630. The network 620 can comprise any combination of local area or wide area networks, using wired or wireless communication systems.

In one embodiment, the user device 610 can include a mapping module 615. In some embodiments, the mapping module 615 can be implemented as the mapping module 110 of FIG. 1. As discussed previously, it should be appreciated that there can be many variations or other possibilities. For example, in some instances, the mapping module 615 (or at least a portion of it) can be included or implemented in a remote system connected to the network 620.

In one embodiment, the network 620 uses standard communications technologies and protocols. Thus, the network 620 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 620 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 620 can be represented using technologies or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

Hardware Implementation

Figure 7:
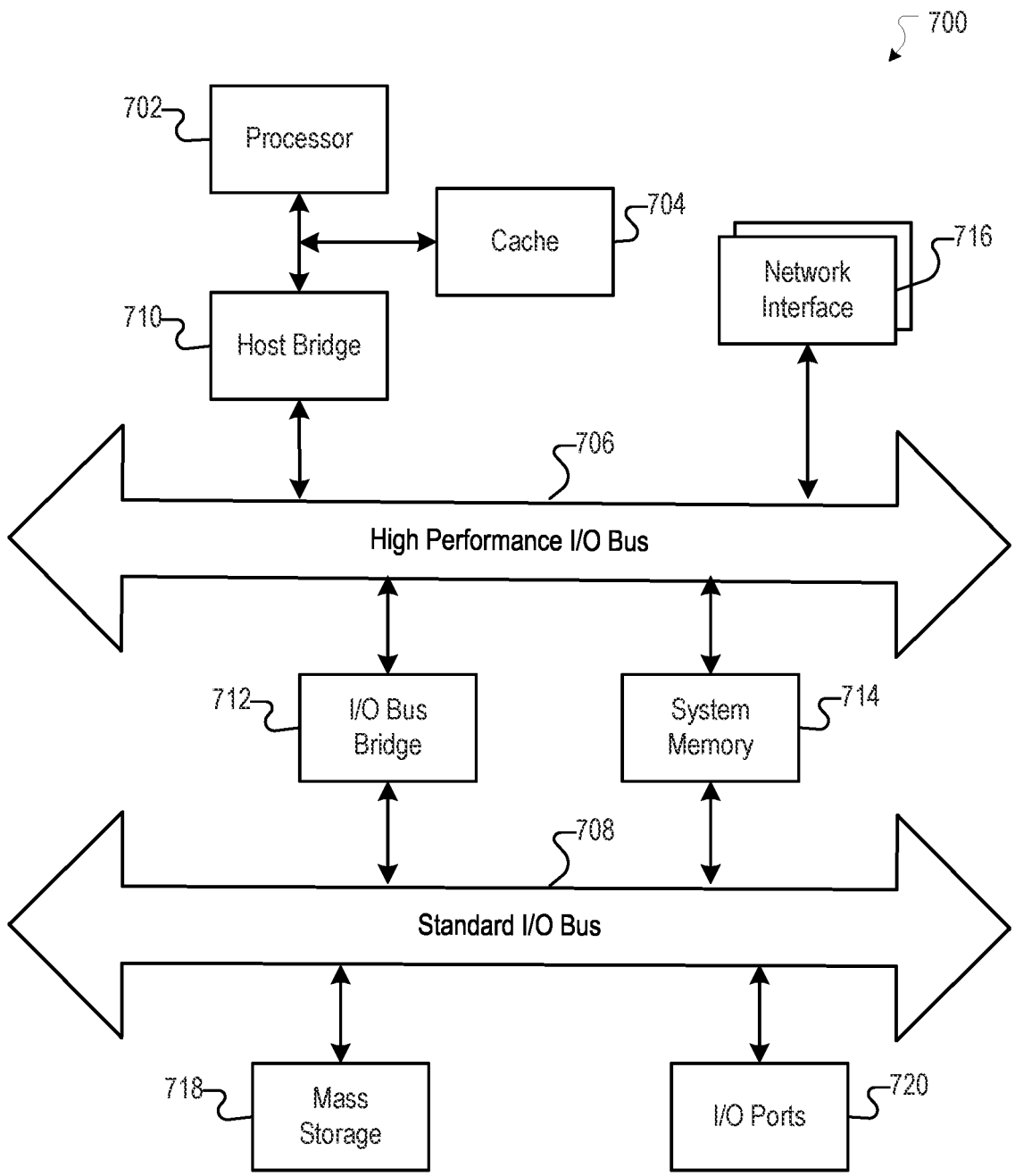
FIG. 7 illustrates an example computer system or computing device that can be used in various scenarios, in accordance with one embodiment of the present disclosure.

The described methods can be implemented by a wide variety of machine and computer system architectures and in a wide variety of network and computing environments. FIG. 7 illustrates an example of a computer system 700 that can be used to implement one or more of the described embodiments. The computer system 700 includes sets of instructions for causing the computer system 700 to perform the described processes. The computer system 700 can be connected (e.g., networked) to other machines. In a networked deployment, the computer system 700 can operate in the capacity of a server machine or a client machine in a client-server network environment, or as a peer machine in a peer-to-peer (or distributed) network environment. In one embodiment, the computer system 700 can be the user device 610 of FIG. 6.

The computer system 700 includes a processor 702, a cache 704, and one or more executable modules and drivers, stored on a computer-readable medium, directed to the described processes. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 can further include video memory and a display device coupled to the video memory (not shown). Mass storage 718 and I/O ports 720 couple to the standard I/O bus 708. The computer system 700 can optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, California, and the x86-compatible processors manufactured by Advanced Micro Devices (AMD), Inc., of Sunnyvale, California, as well as any other suitable processor.

An operating system manages and controls the operation of the computer system 700, including the input and output of data to and from software applications (not shown). The operating system provides an interface between the software applications being executed on the system and the hardware components of the system. Any suitable operating system can be used, such as the LINUX Operating System, the Apple Macintosh Operating System, available from Apple Computer Inc. of Cupertino, California, UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 can be one or more serial or parallel communication ports, which provide communication between additional peripheral devices that can be coupled to the computer system 700.

The computer system 700 can include a variety of system architectures, and various components of the computer system 700 can be rearranged. For example, the cache 704 can be on-chip with processor 702. Alternatively, the cache 704 and the processor 702 can be packed together as a "processor module," with processor 702 being referred to as the "processor core." Furthermore, certain embodiments of the disclosure can neither require nor include all of the above components. For example, peripheral devices coupled to the standard I/O bus 708 can couple to the high performance I/O bus 706. In addition, in some embodiments, only a single bus can exist, with the components of the computer system 700 being coupled to the single bus. Moreover, the computer system 700 can include additional components, such as additional processors, storage devices, or memories.

In general, the described processes can be implemented as part of an operating system or a specific application, component, program, object, module, or series of instructions referred to as "programs." For example, one or more programs can be used to execute specific processes. The programs typically comprise one or more instructions in various memory and storage devices in the computer system 700 that, when read and executed by one or more processors, cause the computer system 700 to perform operations to execute the described processes. The described processes can be implemented in software, firmware, hardware (e.g., an application specific integrated circuit), or any combination of these.

In one implementation, the described processes are implemented as a series of executable modules run by the computer system 700, individually or collectively in a distributed computing environment. The foregoing modules can be realized by hardware, executable modules stored on a computer-readable medium (or machine-readable medium), or a combination of both. For example, the modules can comprise a plurality or series of instructions to be executed by a processor in a hardware system, such as the processor 702. Initially, the series of instructions can be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the described processes.

Engines, Components, and Logic

Certain embodiments are described in this application as including logic or a number of components, engines, or mechanisms. Engines can constitute either software engines (e.g., code embodied on a machine-readable medium) or hardware engines. A "hardware engine" is a tangible unit capable of performing certain operations and can be configured or arranged in a certain physical manner. In various example embodiments, one or more computer systems (e.g., a standalone computer system, a client computer system, or a server computer system) or one or more hardware engines of a computer system (e.g., a processor or a group of processors) can be configured by software (e.g., an application or application portion) as a hardware engine that operates to perform certain operations as described in this application.

In some embodiments, a hardware engine can be implemented mechanically, electronically, or any suitable combination thereof. For example, a hardware engine can include dedicated circuitry or logic that is permanently configured to perform certain operations. For example, a hardware engine can be a special-purpose processor, such as a Field-Programmable Gate Array (FPGA) or an Application Specific Integrated Circuit (ASIC). A hardware engine can also include programmable logic or circuitry that is temporarily configured by software to perform certain operations. For example, a hardware engine can include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) can be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described in this application. As used in this disclosure, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor can be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines can be regarded as being communicatively coupled. Where multiple hardware engines exist contemporaneously, communications can be achieved through signal transmission (e.g., over appropriate circuits and buses) between or among two or more of the hardware engines. In embodiments in which multiple hardware engines are configured or instantiated at different times, communications between such hardware engines can be achieved, for example, through the storage and retrieval of information in memory structures to which the multiple hardware engines have access. For example, one hardware engine can perform an operation and store the output of that operation in a memory device to which it is communicatively coupled. A further hardware engine can then, at a later time, access the memory device to retrieve and process the stored output. Hardware engines can also initiate communications with input or output devices, and can operate on a resource (e.g., a collection of information).

The various operations of example methods described in this application can be performed, at least partially, by one or more processors that are temporarily configured (e.g., by software) or permanently configured to perform the relevant operations. Whether temporarily or permanently configured, such processors can constitute processor-implemented engines that operate to perform one or more operations or functions described in this application. As used in this disclosure, "processor-implemented engine" refers to a hardware engine implemented using one or more processors.

Similarly, the methods described in this application can be at least partially processor-implemented, with a particular processor or processors being an example of hardware. For example, at least some of the operations of a method can be performed by one or more processors or processor-implemented engines. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an Application Program Interface (API)).

The performance of certain of the operations can be distributed among the processors, not only residing within a single machine, but deployed across a number of machines. In some example embodiments, the processors or processor-implemented engines can be located in a single geographic location (e.g., within a home environment, an office environment, or a server farm). In other example embodiments, the processors or processor-implemented engines can be distributed across a number of geographic locations.

It should be appreciated from the foregoing description that the present disclosure provides methods, systems, and non-transitory computer readable media configured display a geographical map overlaid with a marker layer, and provide an improved method of visualizing geospatial data, allowing trends and patterns to be revealed at smaller map scales while maintaining the ability to identify individual markers at small and large scales.

Language

Although the disclosure has been described in detail for the purpose of illustration based on what is currently considered to be the most practical and preferred implementations, it is to be understood that such detail is solely for that purpose and that the disclosure is not limited to the disclosed implementations. On the contrary, the disclosure is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

For purposes of explanation, numerous specific details are outlined to provide a thorough understanding of the description. It will be apparent, however, to one skilled in the art that embodiments of the disclosure can be practiced without these specific details. In some instances, modules, structures, processes, features, and devices are shown in block diagram form to avoid obscuring the description. In other instances, functional block diagrams and flow diagrams are shown to represent data and logic flows. The components of block diagrams and flow diagrams (e.g., modules, blocks, structures, devices, features, etc.) can be variously combined, separated, removed, reordered, and replaced in a manner other than as expressly described and depicted.

Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter of this application.

Additionally, boundaries between various resources, operations, engines, engines, and data stores are somewhat arbitrary, and particular operations are illustrated in a context of specific illustrative configurations. Other allocations of functionality are envisioned and can fall within a scope of various embodiments of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Specific methods, devices, and materials are described, although any methods and materials similar or equivalent to those described can be used in the practice or testing of the present embodiment. Unless defined otherwise, all technical and scientific terms used in this description have the same meanings as commonly understood by one of ordinary skill in the art to which this embodiment belongs.

The terms "a," "an," and "at least one" encompass one or more of the specified element. Thus, plural instances can be provided for resources, operations, or structures described in this application as a single instance. That is, if two of a particular element are present, one of these elements is also present and thus "an" element is present. The terms "a plurality of" and "plural" mean two or more of the specified element. The term "or" used between the last two of a list of elements means any one or more of the listed elements. For example, the phrase "A, B, or C" means "A, B, and/or C," which means "A," "B," "C," "A and B," "A and C," "B and C," or "A, B, and C."

Reference in this specification to "one embodiment," "an embodiment," "other embodiments," "one series of embodiments," "some embodiments," "various embodiments," or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether there is express reference to an "embodiment" or the like, various features are described, which can be variously combined and included in some embodiments, but also variously omitted in other embodiments. Similarly, various features are described that can be preferences or requirements for some embodiments, but not other embodiments.

Conditional language, such as, among others, "can," "could," "might," or "may," unless specifically stated otherwise, or otherwise understood within the context as used, is generally intended to convey that certain embodiments include, while other embodiments do not include, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements or steps are included or are to be performed in any particular embodiment.

It will be appreciated that an "engine," "system," "data store," or "database" can comprise software, hardware, firmware, or circuitry. In one example, one or more software programs comprising instructions capable of being executable by a processor can perform one or more of the functions of the engines, data stores, databases, or systems described in this application. In another example, circuitry can perform the same or similar functions. Alternative embodiments can comprise more, less, or functionally equivalent engines, systems, data stores, or databases, and still be within the scope of present embodiments. For example, the functionality of the various systems, engines, data stores, or databases can be combined or divided differently.

The data stores described in this application can be any suitable structure (e.g., an active database, a high-scale time series database, relational database, a self-referential database, a table, a matrix, an array, a flat file, a documented-oriented storage system, a non-relational No-SQL system, and the like), and can be cloud-based or otherwise.

Without further elaboration, it is believed that one skilled in the art, using the proceeding description, can make and use the present disclosure to the fullest extent. The disclosure has been described in detail with reference only to the presently preferred embodiments. Persons skilled in the art will appreciate that various modifications can be made without departing from the disclosure. Accordingly, the disclosure is defined only by the following claims, along with the full range of equivalents to which the claims are entitled.

The invention claimed is:

1. A computer-implemented method, implemented by a computing system, the method comprising:
   displaying a geographical map overlaid with a first marker layer comprising a first marker of a first type and a second marker layer comprising a second marker of a second type, wherein the geographical map, the first marker layer, and the second marker layer are presented at a first map scale, the first marker is presented at a first marker size, and the second marker is presented at a second marker size;
   in response to a change of a zoom level of the geographical map to a second map scale:
      based on whether the second map scale is within a first range from a first low threshold point to a first high threshold point, wherein the first lower threshold point and the first high threshold point correspond to the first marker:
         determining whether to change a first size of the first marker; and
         in response to determining to change the first size of the first marker; determining a first extent to which the first size of the first marker is to be changed; and
         changing the first size of the first marker by the first extent;
      based on whether the second map scale is within a second range from a second low threshold point to a second high threshold point, wherein the second low threshold point and the second high threshold point correspond to the second marker:
         determining whether to change a second size of the second marker; and
         in response to determining to change the second size of the second marker; determining a second extent to which the second size of the second marker is to be changed; and
         changing the second size of the second marker by the second extent; and
      overlaying the first marker and the second marker onto the geographical map, the geographical map being displayed at the second map scale.

2. The computer-implemented method of claim 1, wherein the determination of the extent to which the size of the first marker is to be changed comprises:
   in response to the second map scale being within the first range from the first low threshold point to the first high threshold point, increasing the size of the first marker as the zoom level is increased.

3. The computer-implemented method of claim 2, wherein the increase of the size of the first marker is according to a linear, quadratic, or logarithmic relationship with respect to the zoom level, within the first range from the first low threshold point to the first high threshold point.

4. The computer-implemented method of claim 3, wherein the first low threshold point is greater than a minimum map scale, and wherein the first high threshold point is less than a maximum map scale.

5. The computer-implemented method of claim 2, wherein the increase of the first size of the first marker is according to a first relationship or a first factor with respect to the zoom level, within the first range from the first low threshold point to the first high threshold, and the determination of the extent to which the second size of the second marker is to be changed comprises:
   in response to the second map scale being within the second range from the second low threshold point to the second high threshold point, increasing the second size of the second marker as the zoom level is increased according to a second relationship or a second factor.

6. The computer-implemented method of claim 1, wherein the determination of the extent to which the size of the first marker is to be changed comprises:
   in response to the second map scale being outside of the first range from the first low threshold point to the first high threshold point, maintaining a constant size of the first marker as the zoom level is increased or decreased.

7. The computer-implemented method of claim 1, wherein the determination of the extent to which the size of the first marker is to be changed comprises:
   in response to the second map scale being outside of the first range from the first low threshold point to the first high threshold point, increasing, at a first rate with respect to an increase in the zoom level, a size of the first marker as the zoom level is increased; and
   in response to the second map scale being within the first range from the first low threshold point to the first high threshold point, increasing, at a second rate with respect to an increase in the zoom level, a size of the first marker as the zoom level is increased, wherein the first rate is smaller than the second rate.

8. The computer-implemented method of claim 1, wherein the first low threshold point and the first high threshold point are determined based on a density of first markers of the first type.

9. The computer-implemented method of claim 1, wherein the first low threshold point and the first high threshold point are determined based on a first density of first markers of the first type and a second density of second markers of the second type.

10. The computer-implemented method of claim 1, wherein the first low threshold point is different from the second low threshold point, and the first high threshold point is different from the second high threshold point.

11. A system comprising:
at least one processor; and
a memory storing instructions that, when executed by the at least one processor, cause the system to perform a method comprising:
displaying a geographical map overlaid with a first marker layer comprising a first marker of a first type and a second marker layer comprising a second marker of a second type, wherein the geographical map, the first marker layer, and the second marker layer are presented at a first map scale, the first marker is presented at a first marker size, and the second marker is presented at a second marker size;
in response to a change of a zoom level of the geographical map to a second map scale:
based on whether the second map scale is within a first range from a first low threshold point to a first high threshold point, wherein the first lower threshold point and the first high threshold point correspond to the first marker:
determining whether to change a first size of the first marker;
in response to determining to change the first size of the first marker; determining a first extent to which the first size of the first marker is to be changed; and
changing the first size of the first marker by the first extent;
based on whether the second map scale is within a second range from a second low threshold point to a second high threshold point, wherein the second low threshold point and the second high threshold point correspond to the second marker:
determining whether to change a second size of the second marker;
in response to determining to change the second size of the second marker; determining a second extent to which the second size of the second marker is to be changed; and
changing the second size of the second marker by the second extent; and
overlaying the first marker and the second marker onto the geographical map, the geographical map being displayed at the second map scale.

12. The system of claim 11, wherein the determination of the extent to which the size of the first marker is to be changed comprises:
in response to the second map scale being within the first range from the first low threshold point to the first high threshold point, increasing the size of the first marker as the zoom level is increased.

13. The system of claim 12, wherein the increase of the size of the first marker is according to a linear, quadratic, or logarithmic relationship with respect to the zoom level, within the first range from the first low threshold point to the first high threshold point.

14. The system of claim 13, wherein the first low threshold point is greater than a minimum map scale, and wherein the first high threshold point is less than a maximum map scale.

15. The system of claim 12, wherein the increase of the first size of the first marker is according to a first relationship or a first factor with respect to the zoom level, within the first range from the first low threshold point to the first high threshold, and the determination of the extent to which the second size of the second marker is to be changed comprises:
in response to the second map scale being within the second range from the second low threshold point to the second high threshold point, increasing the second size of the second marker as the zoom level is increased according to a second relationship or a second factor.

16. A non-transitory computer-readable storage medium including instructions that, when executed by at least one processor of a computing system, cause the computing system to perform a method comprising:
displaying a geographical map overlaid with a first marker layer comprising a first marker of a first type and a second marker layer comprising a second marker of a second type, wherein the geographical map, the first marker layer, and the second marker layer are presented at a first map scale, the first marker is presented at a first marker size, and the second marker is presented at a second marker size;
in response to a change of a zoom level of the geographical map to a second map scale:
based on whether the second map scale is within a range from a first low threshold point to a first high threshold point, wherein the first lower threshold point and the first high threshold point correspond to the first marker:
determining whether to change a first size of the first marker;
in response to determining to change the first size of the first marker; determining a first extent to which the first size of the first marker is to be changed; and
changing the first size of the first marker by the first extent;
based on whether the second map scale is within a second range from a second low threshold point to a second high threshold point, wherein the second low threshold point and the second high threshold point correspond to the second marker:
determining whether to change a second size of the second marker;
in response to determining to change the second size of the second marker; determining a second extent to which the second size of the second marker is to be changed; and
changing the second size of the second marker by the second extent; and
overlaying the first marker and the second marker onto the geographical map, the geographical map being displayed at the second map scale.

17. The non-transitory computer-readable storage medium of claim 16, wherein the determination of the extent to which the size of the first marker is to be changed comprises:
    in response to the second map scale being within the first range from the first low threshold point to the first high threshold point, increasing the size of the first marker as the zoom level is increased.

18. The non-transitory computer-readable storage medium of claim 17, wherein the increase of the size of the first marker is according to a linear, quadratic, or logarithmic relationship with respect to the zoom level, within the first range from the first low threshold point to the first high threshold point.

19. The non-transitory computer-readable storage medium of claim 18, wherein the first low threshold point is greater than a minimum map scale, and wherein the first high threshold point is less than a maximum map scale.

20. The non-transitory computer-readable storage medium of claim 17, wherein the increase of the first size of the first marker is according to a first relationship or a first factor with respect to the zoom level, within the first range from the first low threshold point to the first high threshold, and the determination of the extent to which the second size of the second marker is to be changed comprises:
    in response to the second map scale being within the second range from the second low threshold point to the second high threshold point, increasing the second size of the second marker as the zoom level is increased according to a second relationship or a second factor.

* * * * *